(12) United States Patent
Jorba Closa et al.

(10) Patent No.: US 10,471,731 B2
(45) Date of Patent: Nov. 12, 2019

(54) PRINTING SYSTEMS

(71) Applicant: Hewlett-Packard Development Company, L.P., Fort Collins, CO (US)

(72) Inventors: Joan Albert Jorba Closa, Sant Cugat del Valles (ES); Antonio Gracia Verdugo, Sant Cugat del Valles (ES); Marina Cantero Lazaro, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 84 days.

(21) Appl. No.: 15/546,241

(22) PCT Filed: Apr. 23, 2015

(86) PCT No.: PCT/EP2015/058799
§ 371 (c)(1),
(2) Date: Jul. 25, 2017

(87) PCT Pub. No.: WO2016/169602
PCT Pub. Date: Oct. 27, 2016

(65) Prior Publication Data
US 2018/0015733 A1    Jan. 18, 2018

(51) Int. Cl.
*B41J 2/21* (2006.01)
*H04N 1/50* (2006.01)
(Continued)

(52) U.S. Cl.
CPC ............. *B41J 2/2135* (2013.01); *B41J 2/155* (2013.01); *B41J 2/2132* (2013.01); *H04N 1/50* (2013.01); *H04N 1/506* (2013.01); *B41J 29/393* (2013.01)

(58) Field of Classification Search
CPC ........ B41J 2/2135; B41J 2/155; B41J 2/2132; B41J 29/393; H04N 1/50; H04N 1/506
See application file for complete search history.

(56) References Cited

U.S. PATENT DOCUMENTS

| 5,079,571 A | 1/1992 | Eriksen |
| 5,912,683 A | 6/1999 | Eade |
| 6,439,685 B1 | 8/2002 | Kojima |

(Continued)

FOREIGN PATENT DOCUMENTS

| CN | 1106944 | 8/1995 |
| CN | 1194611 | 9/1998 |

(Continued)

OTHER PUBLICATIONS

PCT International Search Report and Written Opinion, dated Dec. 22, 2015, PCT Application No. PCT/EP2015/058799, European Patent Office, 10 pages.

(Continued)

*Primary Examiner* — Henok D Legesse
(74) *Attorney, Agent, or Firm* — HP Inc. Patent Department

(57) ABSTRACT

A printing system comprises a processor to obtain image data comprising first image data defining a first color plane of the image and comprising second image data defining a second color plane of the image. The processor is to manipulate the image data such that the second color plane is shifted relative to the first color plane in a media axis direction of a printer. The printing system comprises a printer to print the manipulated image data with the printer.

18 Claims, 13 Drawing Sheets

(51) Int. Cl.
*B41J 2/155* (2006.01)
*B41J 29/393* (2006.01)

(56) References Cited

U.S. PATENT DOCUMENTS

| | | | |
|---|---|---|---|
| 6,764,162 B2 | 7/2004 | Biddle et al. | |
| 6,788,432 B1 | 9/2004 | Garcia et al. | |
| 6,799,823 B2 | 10/2004 | Miquel et al. | |
| 7,036,904 B2 | 5/2006 | King et al. | |
| 7,845,751 B2 | 12/2010 | Rueby | |
| 8,272,710 B2 | 9/2012 | Spaulding et al. | |
| 8,864,256 B2 * | 10/2014 | Azuma | B41J 2/2146 347/9 |
| 2004/0233246 A1 | 11/2004 | Takeushi | |
| 2006/0209109 A1 * | 9/2006 | Arazaki | B41J 29/393 347/12 |
| 2007/0024662 A1 * | 2/2007 | Arazaki | B41J 29/393 347/19 |
| 2007/0076039 A1 * | 4/2007 | Batalla | B41J 29/393 347/19 |
| 2007/0139460 A1 * | 6/2007 | Araki | B41J 2/2142 347/19 |
| 2009/0021543 A1 * | 1/2009 | Baba | B41J 2/2135 347/9 |
| 2010/0321434 A1 * | 12/2010 | Baba | B41J 29/38 347/12 |
| 2010/0328390 A1 * | 12/2010 | Bannai | B41J 29/393 347/14 |

FOREIGN PATENT DOCUMENTS

| | | |
|---|---|---|
| CN | 1300672 | 6/2001 |
| CN | 1596192 | 3/2005 |
| EP | 0938976 | 9/1999 |

OTHER PUBLICATIONS

Thor Olson; Smooth Ramps: Walking the Straight and Narrow Path Through Color Space; Management Graphics Inc.; Aug. 31, 1999.

* cited by examiner

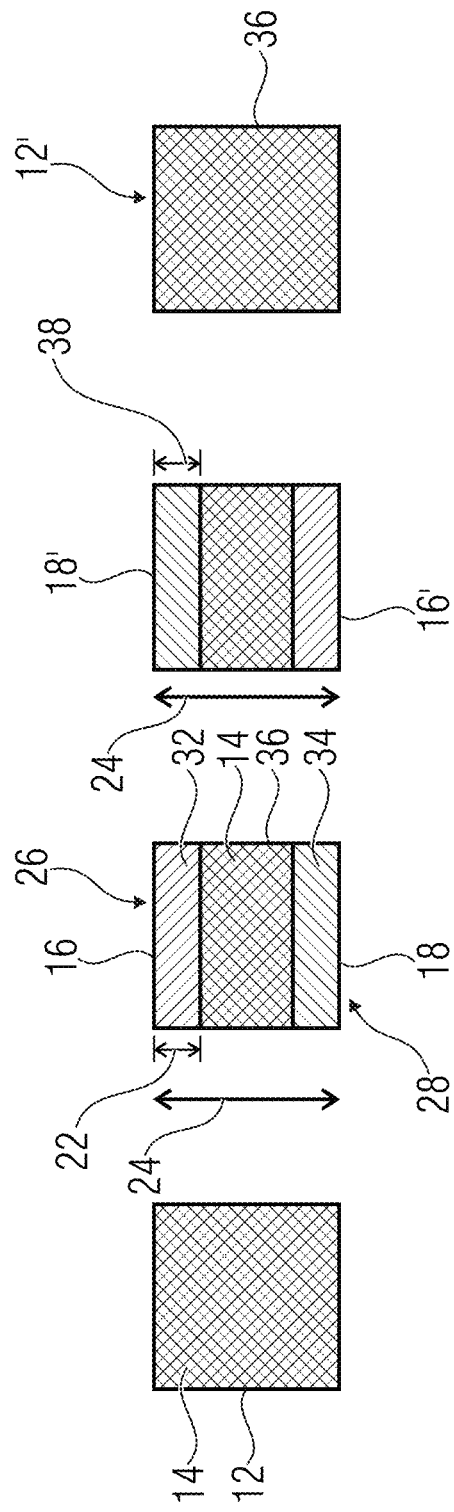

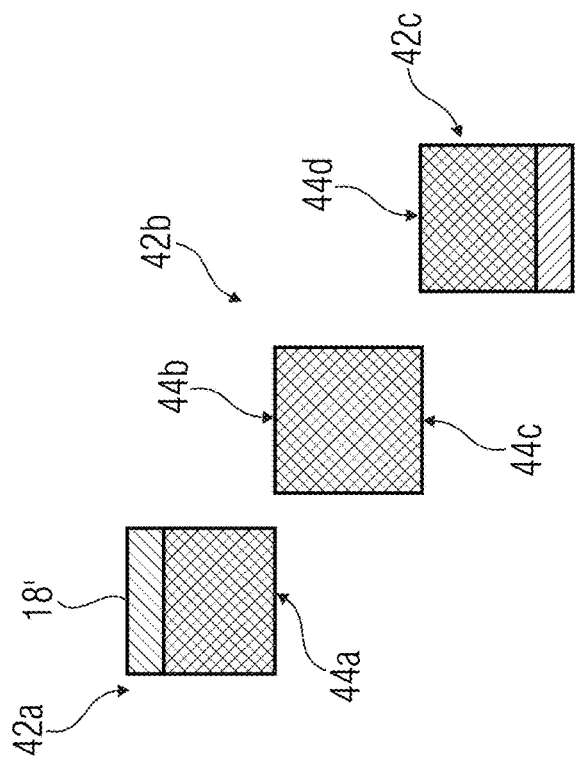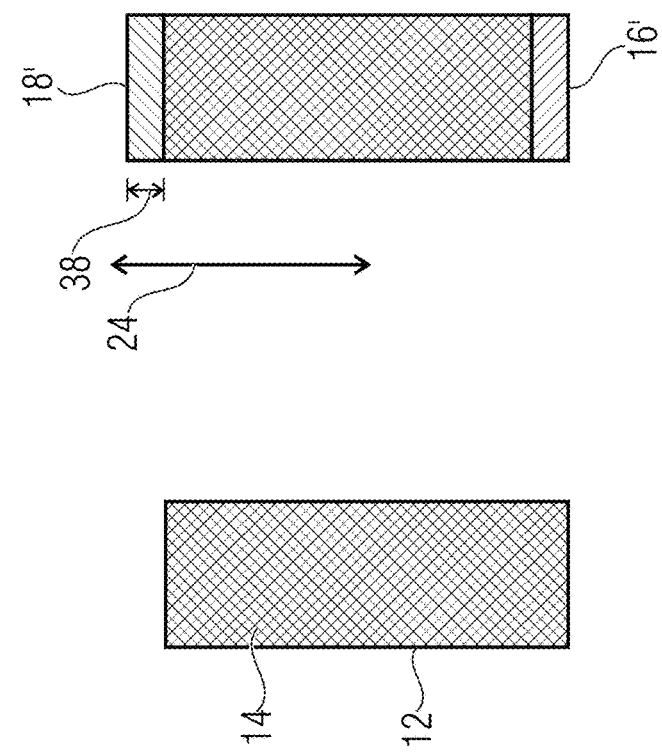

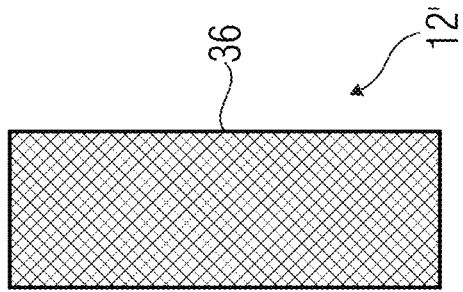
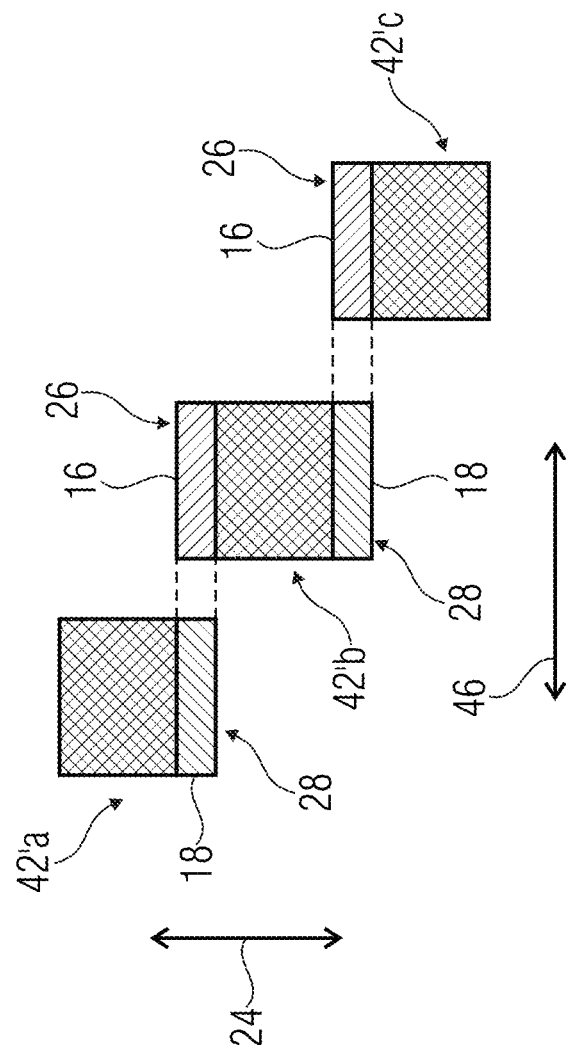

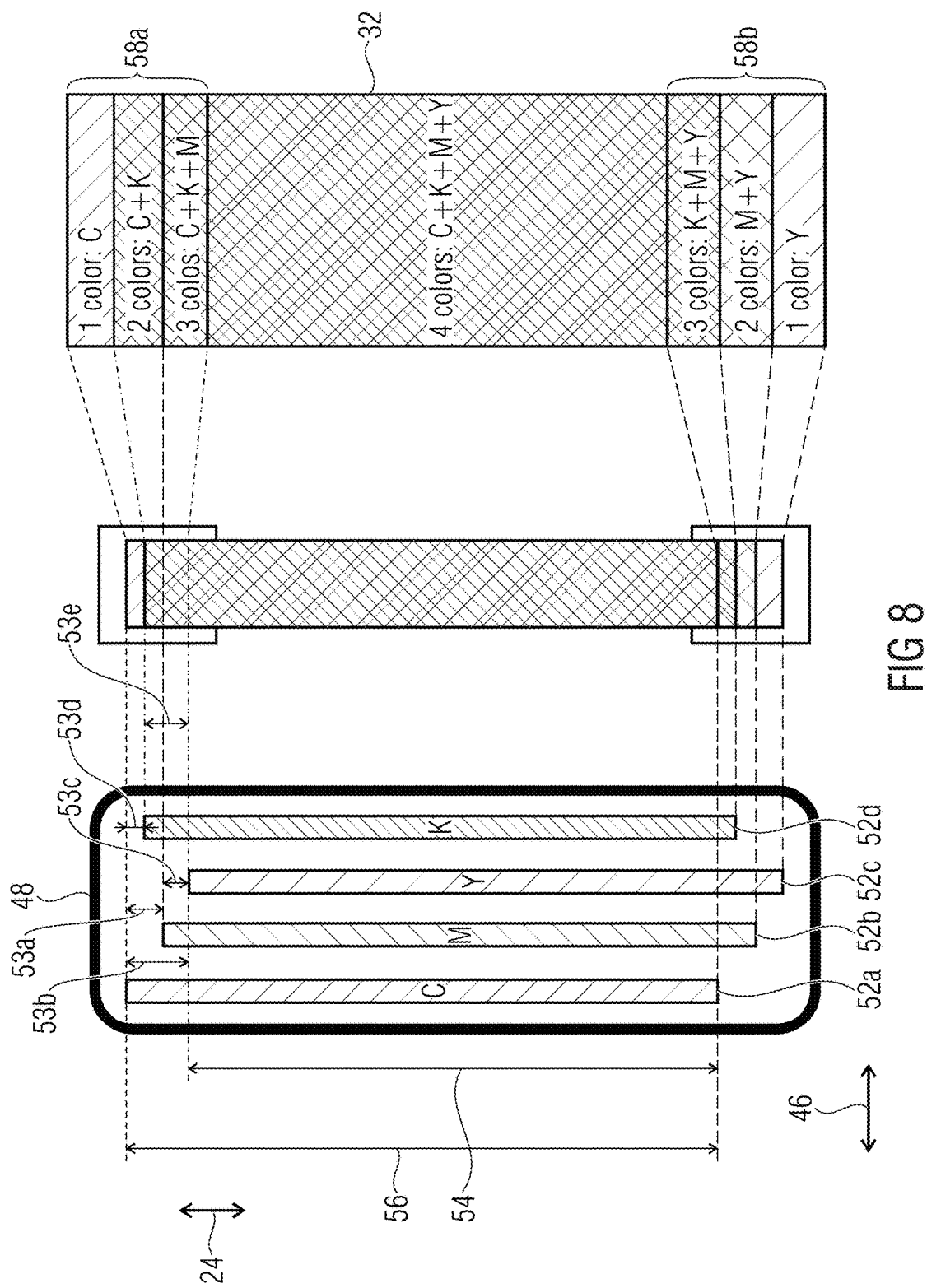

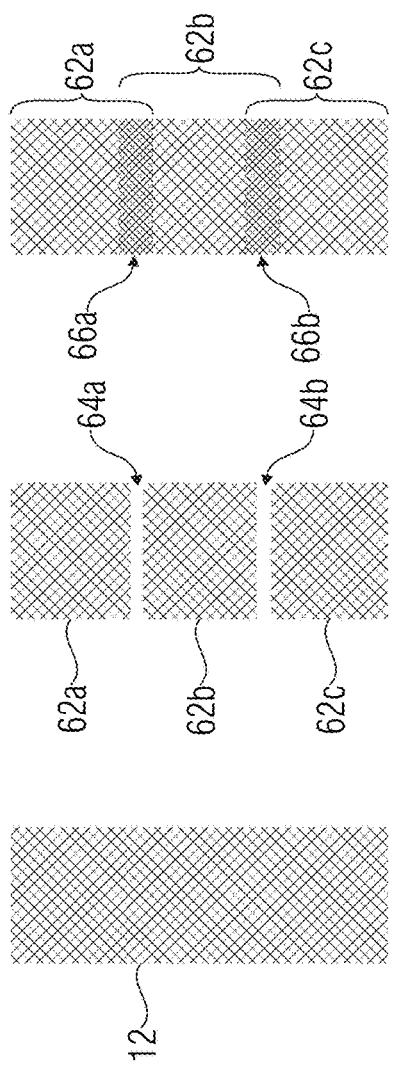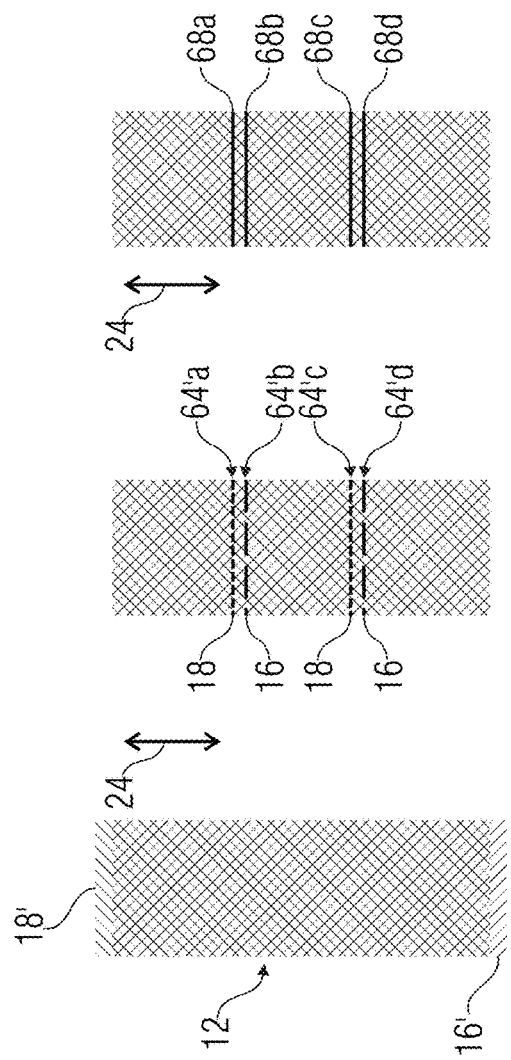

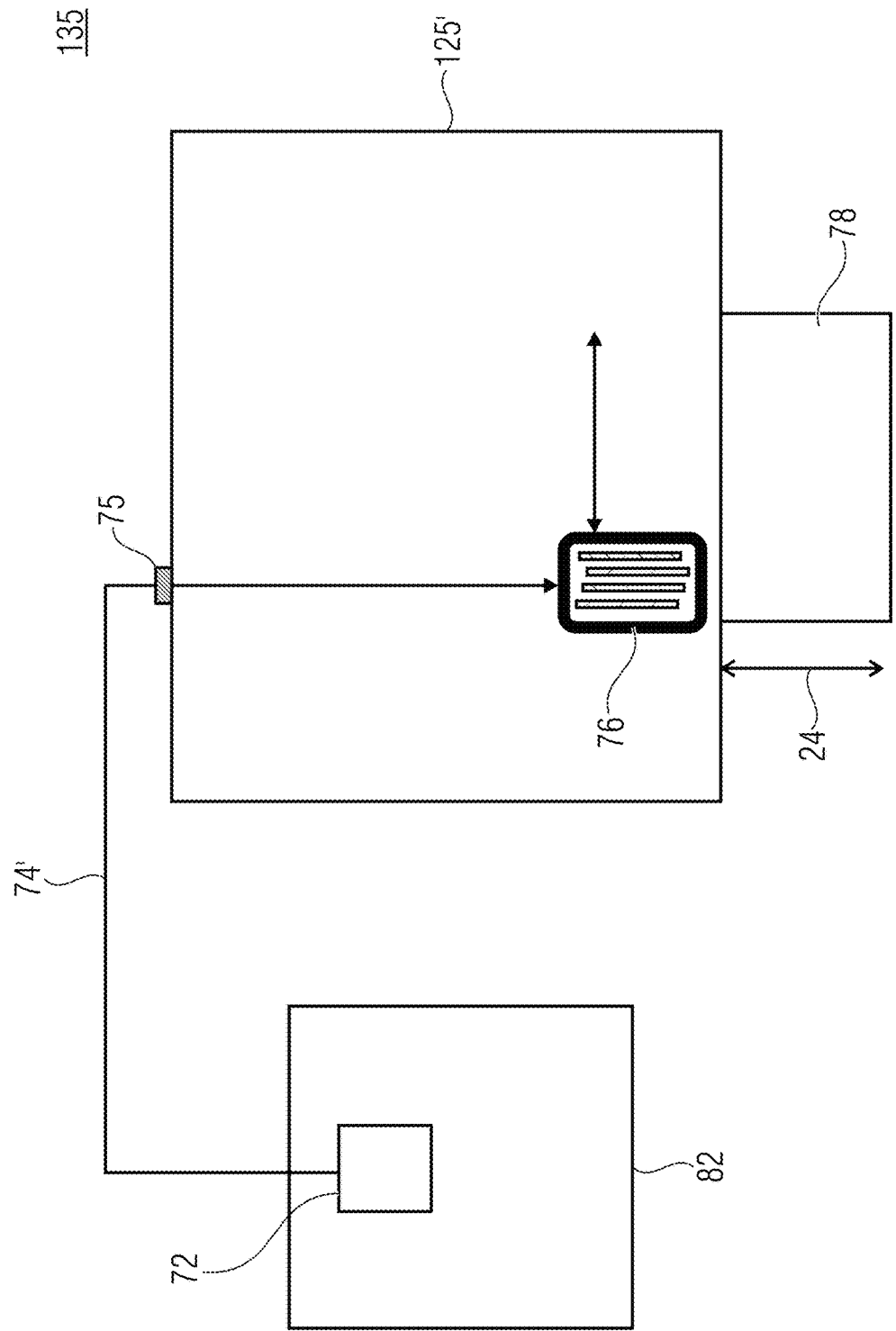

PRINTING SYSTEMS

BACKGROUND

Productivity may be important to printers. Improving image quality at low number of passes may be a way to succeed. One challenge when printing at low number of passes, for example at a number from 1 to 4, may be the line banding caused by paper advance errors.

Some printing systems may use an ink-jet for transferring colors to a print. Some printing systems may use electrostatic forces for transferring colors, for example by a dry toner powder or a liquid toner.

BRIEF DESCRIPTION

Examples will now be described by way of non-limiting example only with reference to the accompanying drawings, in which:

FIGS. 6A, 6B, 6C and 6D are simplified illustrations of a scenario of a paper axis direction correction according to one example;

FIGS. 7A, 7B, 7C, 7D and 7E are simplified illustrations of a scenario in which an image is printed by printing a plurality of image parts according to one example;

FIG. 8 is a simplified illustration of a printer carriage comprising misaligned printheads according to one example;

FIGS. 9A, 9B and 9C are simplified illustrations of a scenario in which an image is printed;

FIGS. 10A, 10B and 10C are simplified illustrations of a scenario in which the image illustrated in FIGS. 9A-9C is printed according to an example.

FIG. 13 is a schematic block diagram of a further printing system according to one example.

Figure 1:
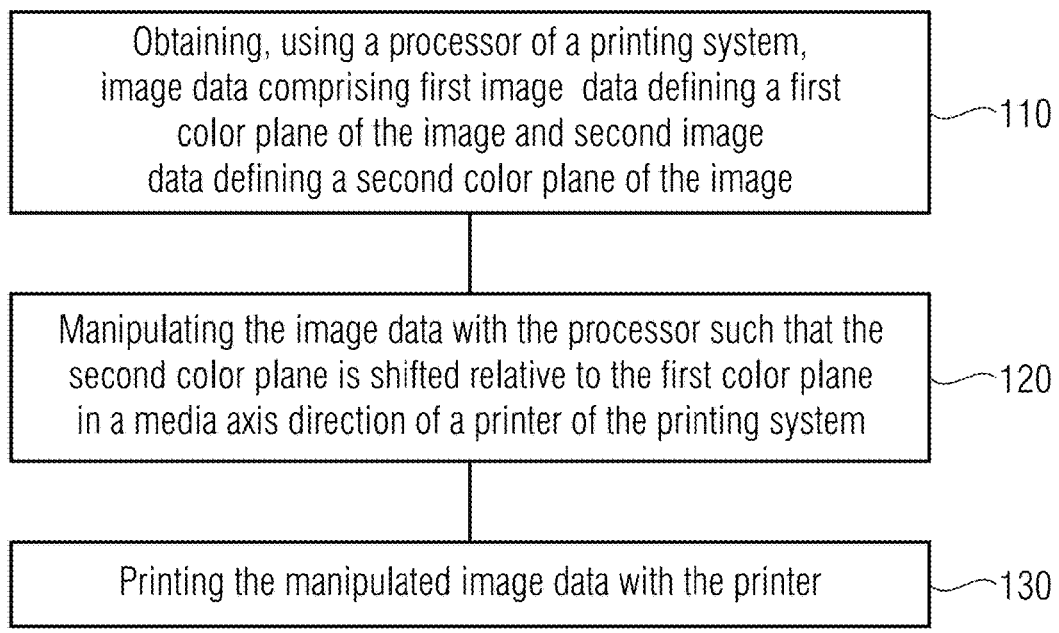
FIG. 1 is a flow diagram outlining a method for printing an image according to one example.

The examples and description below make reference generally to ink-jet printing systems. A color of the printing system may be printed by a set of nozzles. The set of nozzles may be associated with the color(s) to be printed. Each set of nozzles may be part of a separate printhead. According to other examples a printhead may comprise two or more sets of nozzles and may be to print two or more colors associated with the nozzles. Explanations set forth below may refer to a misalignment between printheads but may be transferred without limitations to a misalignment between a set of nozzles.

Printing systems may use a carriage comprising a number of printheads to transfer drops of ink to a medium. For example, the carriage may comprise four printheads, such as cyan, magenta, yellow and black. Other carriages may comprise one printhead, for example, black. Other carriages may comprise a larger number of printheads, for example a half tone cyan and/or a half tone magenta. However, the techniques described herein may also apply, with appropriate modifications, to any other printing systems that use a different number of printheads or that print any type of printing fluid such as liquid electro photographic (LEP) printing systems or dry toner printing systems.

Colors may be obtained on a medium, for example, based to a subtractive color system and based on printing a plurality of color planes on top of each other. When considering a carriage comprising printheads to obtain a printed color on a medium based on an overlay of basic colors of a printer, those printheads may be aligned with respect to each other such that on a location of the print all colors are available. For example, a printhead (pen) alignment may be triggered.

Examples described herein provide a method for printing an image by manipulating image data related to a color plane of an image. A specific color plane may refer to a specific color. The specific color may be a basic color of the printer or a mixture of basic colors. A color plane may refer to a position of the specific color in the image. The color plane may also refer to an area or plane in which the specific color may be printed on the printer. An image may be separated into a two or more color planes. Each color plane may comprise information related to the image, simplified the image in the specific color. Shifting color planes with respect to each other may allow for obtaining images shifted with respect to each other.

According to an example, image data may be obtained by using a processor. The image data may comprise first image data defining a first color plane of the image. The image data may comprise second image data defining a second color plane of the image. The image data may be manipulated with the processor such that the second color plane is shifted relative to the first color plane in a medium axis direction of a printer. The manipulated image data may be printed with the printer.

A misalignment between the printheads of the carriage of the printer may result in a further shift of the color planes with respect to each other. The further shift may be opposed with respect to the shift obtained by using the processor. The shift of the color planes obtained by manipulating the image data may be performed such that the manipulation at least partially compensates for the shift of the color planes obtained during printing.

According to another example, the image data may comprise third image data defining a third color plane of the image and may comprise fourth image data defining a fourth color plane of the image. The image data may be manipulated such that the third color plane and the fourth color plane are shifted relative to the first color plane in the medium axis direction of the printer.

Other examples described herein may provide a method for printing an image comprising a separation of the manipulated image data to obtain a first manipulated image part and a second manipulated image part. The first and/or the second manipulated image part may comprise a size along the medium axis direction of the printer which may correspond to a size of the image that may be printed during one pass of the carriage.

Other examples described herein may provide a method comprising separating the image data to obtain a first image part and a second image part which may correspond to the size of the image that may be printed with one pass of the carriage. The image data may be manipulated such that the second color plane and the first color plane may be shifted relative to each other for each of the image part to obtain manipulated image parts. The manipulated image parts may be printed.

Other examples described herein may provide a method in which an image may be printed with a printer by using a first printhead and a second printhead of the printer. A deviation of the printer may be determined, wherein the deviation may indicate an offset of nozzles of the second printhead relative to nozzles of the first printhead. An information may be provided to a further printer, the information indicating the determined deviation. The provided information may be used by a further printer for shifting a second color plane relative to a first color plane based on the determined deviation.

DETAILED DESCRIPTION

Referring now to FIG. 1, a flow diagram is shown outlining an example method for printing an image.

At 110 image data is obtained using a processor of a printing system. The image data may comprise first image data defining a first color plane of the image. The image data may comprise second image data defining a second color plane of the image. At 120 the image data is manipulated with the processor such that the second color plane is shifted relative to the first color plane in a medium axis direction of a printer of the printing system. At 130 the manipulated image data is printed with the printer.

The image data may comprise image data defining a third color plane and/or a fourth color plane. The image data may comprise image data defining a fifth color plane, e.g., a half tone color. The first color plane and the second color plane may be obtained by the processor when converting an image coded in a first color space into a color space of the printer. For example, the first color space may be a standard red-green-blue color space, also referred to a sRGB or a FOGRA CMYK color space. The color space of the printer may be, for example, a cyan/magenta/yellow/black color space, also referred to as CMYK with or without half toning. A half toning color space may be, for example, a CMYKcm color space. In other words, image data may be obtained comprising information for different color planes, wherein each color plane may be associated with a color of a printer for printing the image, e.g., a basic color.

Each color plane may be associated with a printhead of the printer. A printhead may be misaligned with respect to other printheads of the printer. The misalignment may comprise a shift of nozzles of the printheads along a direction perpendicular to a direction along which a carriage comprising the printheads is moving during printing. The carriage may move, for example, along a supply axis direction (SAD). The direction perpendicular to the SAD may be a direction along which the medium is moved during or between a movement of the carriage and may be referred to as medium axis direction (MAD) or paper axis direction (PAD).

The processor may be used for manipulating the image data such that the color planes are shifted along an opposing direction when compared to the misalignment of the printheads (i.e., when compared to the color planes in the carriage). In other words, the processor may manipulate the image data such that the color planes are misaligned so as to at least partially pre-compensate for the misalignment of the color planes due to the misaligned nozzles.

If the color planes are shifted with respect to each other with at least essentially the same amount when compared to the shift obtained in the printer carriage, the color planes obtained on the medium after printing may be essentially or completely congruent with respect to each other. At least essentially the same amount may refer to an amount by which the color planes are shifted using the processor, which is at least 80%, at least 90%, at least 95% or 100% when compared to the shift obtained in the printer carriage. The method may allow for using all or essentially all nozzles of the printer without deactivating misaligned nozzles. Thus, the method illustrated in FIG. 1 may allow for MAD or PAD correction of the printer with a larger number of nozzles used. According to one example, no nozzles of the printheads are deactivated for PAD correction. According to another example, an amount between 1% and 50% of the misaligned nozzles are deactivated. According to another example, an amount between 10% and 30% of the misaligned nozzles are deactivated. This may allow for large swathes, i.e., area to be printed and therefore for a high printing speed. Images may be printed with a low number of passes such that printing may be performed efficiently. A pass may refer to a transition of the printhead or carriage of the printer over a portion of the medium while printing a swath for obtaining a part of the image on that portion.

Figure 2:
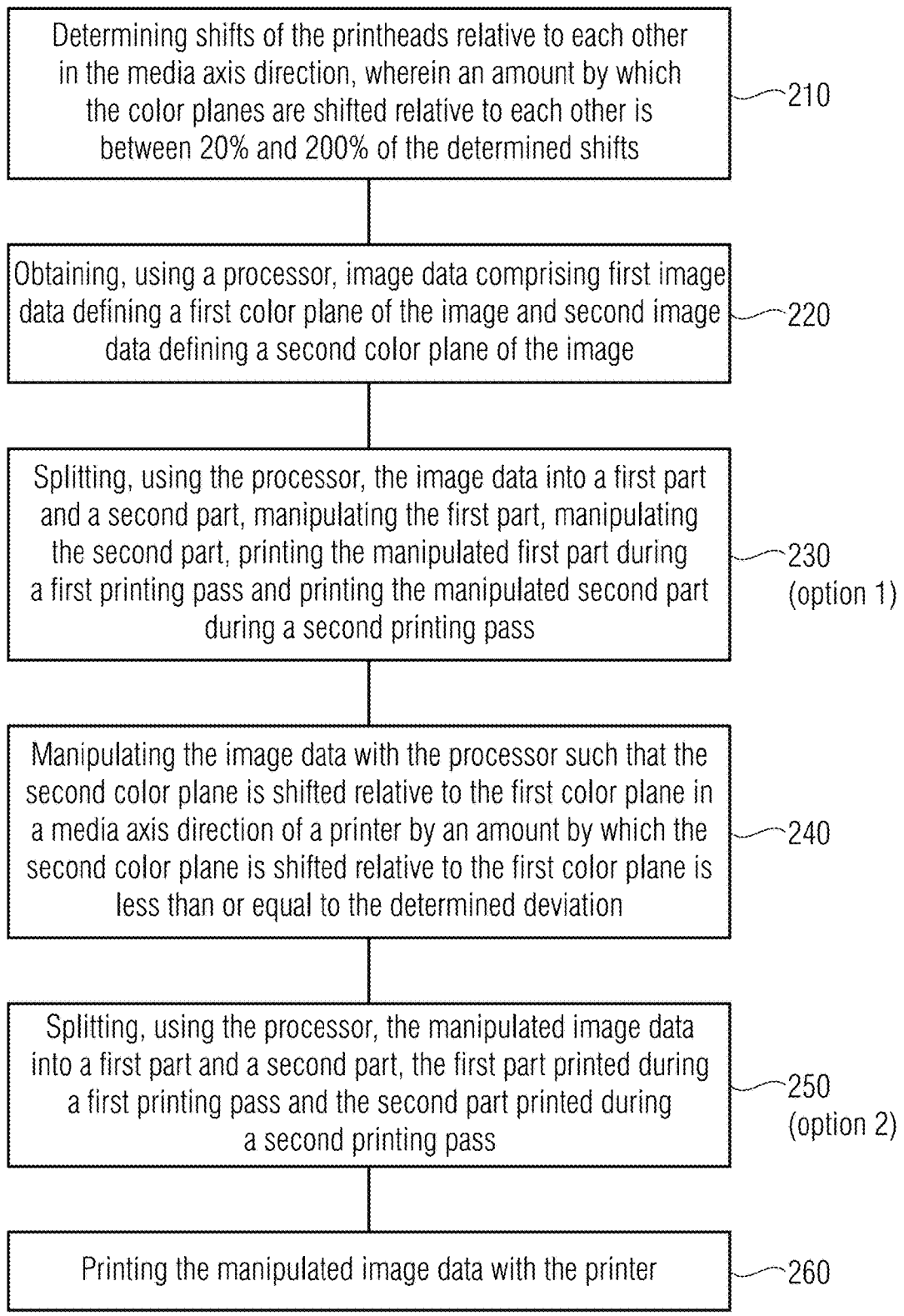
FIG. 2 is a flow diagram outlining a further method for printing an image according to one example.

Referring now to FIG. 2, a flow diagram is shown outlining an example method for printing an image.

At 210 a deviation of nozzles of a first printhead of the printer may be determined relative to nozzles of a second printhead of the printer. A color of the first color plane may be printed with the first printhead. A color of the second color plane may be printed with the second printhead. At 220 image data comprising first image data defining the first color plane of the image and a second image data defining a second color plane of the image may be obtained using a processor. 220 may be equal to 110. At 230 the image data may be split into a first part and a second part. The first part may be manipulated and the second part may be manipulated so as to obtain a first manipulated part and a second manipulated part. The manipulated first part may be printed during a first printing pass. The manipulated second part may be printed during a second printing pass. The first and the second image part may comprise a part of the first color plane and a part of the second color plane. In other words, the image data may be separated into a first and a second sub-image. A size of the image parts may correspond to a size that may be printed during one pass of the printer. 230 may be performed as option 1. 230 may be performed, for example, when the image described by the image data is larger than a size of a swath printed by the printer during a pass or when the image is arranged at a region to be printed during different passes. At 240 the image data is manipulated with the processor such that the second color plane is shifted relative to the first color plane in a medium axis direction of a printer. An amount by which the second color plane is shifted relative to the first color plane may be less than or equal to the deviation determined in 210. At 250 the manipulated image data may be split into a first part and a second part. The first part may be printed during a first printing pass. The second part may be printed during a second printing pass. Each of the image parts may be printed in one pass or a larger number of passes. 250 may be performed as option 2. 250 may be performed, for example, when the image data may be printed with a first and a second swath arranged adjacent to each other. Examples provide a method in which 250 may be performed and 230 may be skipped. Other examples provide a method in which 230 may performed and in which 250 may be skipped. By either performing 230 or 250 manipulated image parts may be obtained by either separating the image and manipulating each part or by manipulating the image and separating the manipulated image into manipulated parts. At 260 the manipulated image data are printed with the printer. For example, in 260 the manipulated image parts may be printed. 260 may be equal to 130.

The image data may be separated into image parts, for example, when the image is printed by a plurality of swaths. The processor used in 220 and 240 may be a processor.

The printer may be controlled by the processor. For example, the processor may be a processor of a computer to which the printer is connected. A connection may be obtained by a data channel to exchange data between the computer and the printer. The data channel may be obtained by a wired connection (e.g., USB or LAN), by a wireless connection (e.g., WLAN) and/or by the internet. According to other examples, the image data may be received by a processor of the printer.

Figure 3:
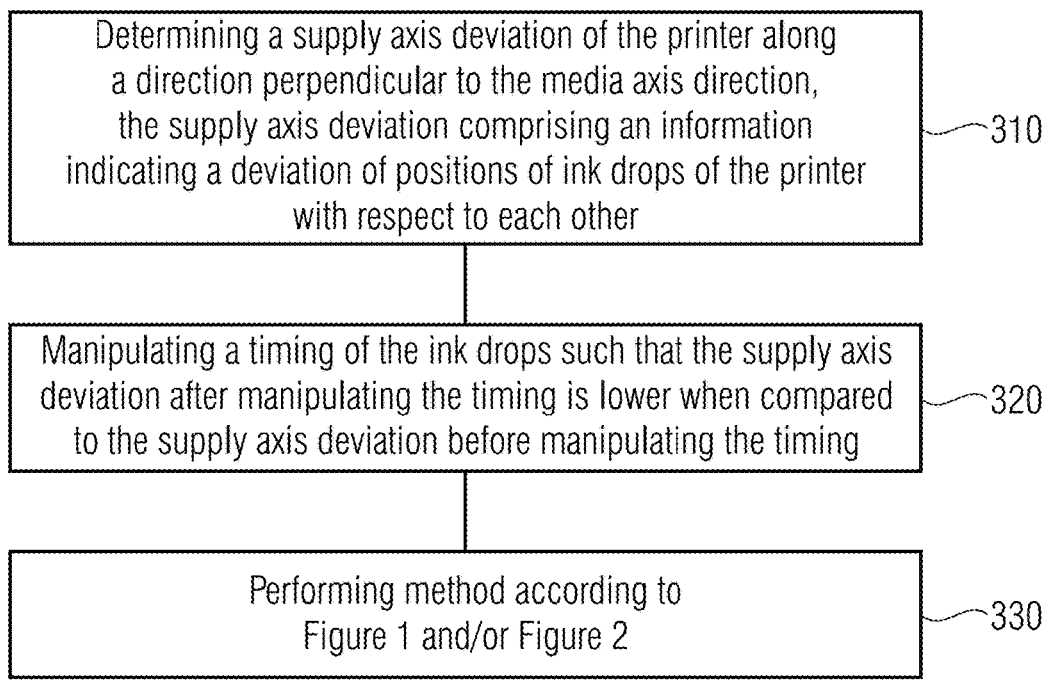
FIG. 3 is a flow diagram outlining a further method for printing an image according to one example.

Referring now to FIG. 3, a flow diagram is illustrated outlining an example method for printing an image.

At 310 a supply axis deviation of the printer along a direction perpendicular to the media axis direction may be determined. The supply axis deviation may comprise an information indicating a deviation of positions of ink drops of the printer with respect to each other. The supply axis deviation may be visible as non-uniformly distributed ink drops, i.e., a distance between the ink drops may vary. At 320 a timing of the ink drops is manipulated such that the supply axis deviation is reduced. 320 may be performed, for example, with the processor. At 330 the method illustrated in FIG. 1 and/or the method illustrated in FIG. 2 is performed. Thus, in addition to the PAD correction which may be obtained by performing 330, additionally an SAD correction may be performed.

A misalignment in SAD may comprise a varying distance between nozzles along the supply axis direction. By manipulating a time at which a nozzle fires its ink drop, this deviation may be reduced or compensated.

Figure 4:
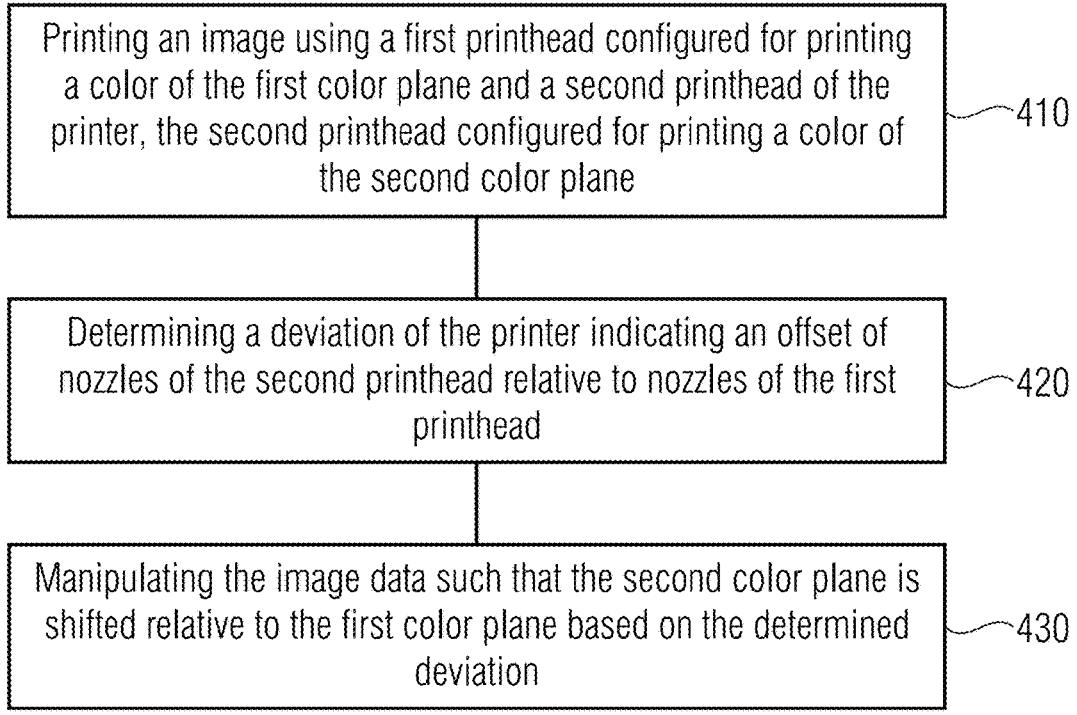
FIG. 4 is a flow diagram outlining a method for manipulating the image data according to one example.

Referring now to FIG. 4, an example method for manipulating the image data is illustrated.

At 410 an image is printed with a printer. The image may be, for example, a test image. Printing the image may comprise printing a color of the first color plane with a first printhead of the printer and printing a color of the second color plane with a second printhead of the printer. At 420 a deviation of the printer is determined. The deviation may indicate an offset of nozzles of the second printhead relative to nozzles of the first printhead. At 430 the image data are manipulated such that the second color plane is shifted to the first color plane based on the determined deviation. 430 may be at least partially performed, for example, when performing 120 or 240.

For example, in 410 a test image may be printed with a swath or during a pass using nozzles such that the first color and the second color is printed in at least one border region of the image. In other words, a test image may be printed such that at least at a border of the test image all colors may be present. In 420 the deviation may be determined by scanning or measuring the printed picture. For example, regions may be identified where not all of the colors deemed to be present are printed. According to another example, a color printed and identified at a region where it is deemed to be absent may indicate the deviation.

Figure 5:
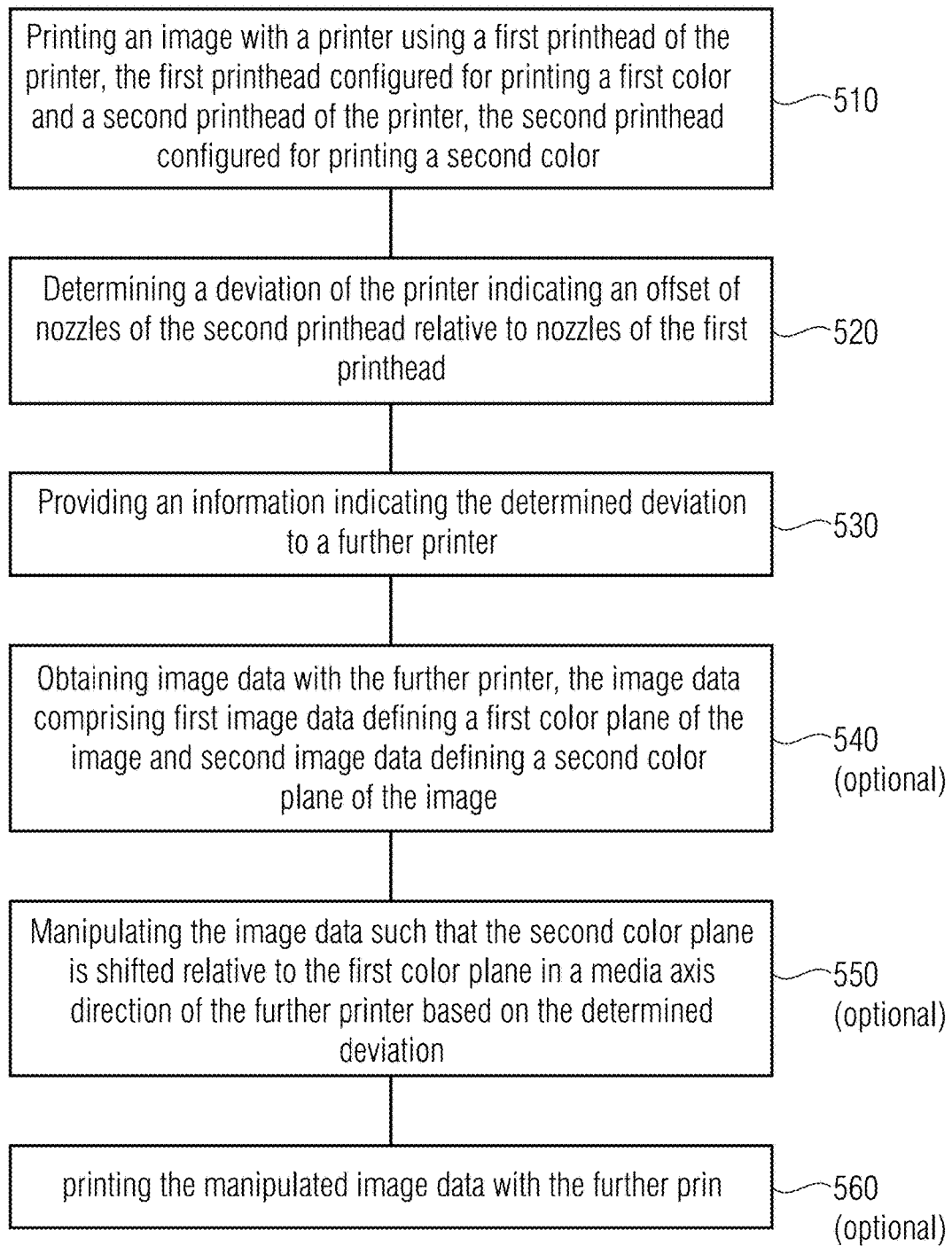
FIG. 5 is a flow diagram outlining a method for providing an information indicating a determined deviation according to one example.

Referring now to FIG. 5, a flow diagram outlining an example method of providing an information indicating a determined deviation is illustrated.

At 510 an image is printed with a printer using a first printhead of the printer and a second printhead of the printer. A first color may be printed with the first printhead. A second color may be printed with the second printhead. At 520 a deviation of the printer indicating an offset of nozzles of the second printhead relative to nozzles of the first printhead is determined. At 530 an information indicating the determined deviation is provided to a further printer. Optionally, at 540 image data is obtained with the further printer. The image data may comprise first image data defining a first color plane of the image. The image data may comprise second image data defining a second color plane of the image. At 550, the image data may be manipulated, such that the second color plane is shifted relative to the first color plane in a medium axis direction of the further printer based on the determined deviation, for example, along a direction opposing a direction along which the deviation occurs. At 560 the manipulated image data may be printed with the further printer. Other examples provide a method in which 540, 550 and/or 560 is skipped.

The further printer may perform correction of the deviation based on an information determined for a different printer or a set of different printers. This may allow for obtaining calibration data for the further printer. The calibration data may be obtained when measuring at least one printer. The calibration data may be obtained when measuring a plurality of different printers. The plurality of different printers may be structurally identical when compared to the printer printing the image. According to other examples, the deviation of the printer may be determined based on measured or simulated structural deviations of the printer carriage. Providing the information indicating the determined deviation may allow for shifting color planes based on the determined deviation for printers that are not capable of measuring their own deviation.

Referring now to FIGS. 6A, 6B, 6C and 6D, simplified illustrations are shown illustrating a PAD correction according to the teachings disclosed herein.

FIG. 6A illustrates a schematic top view of a picture 12 to be printed with a printer. In other words, the image 12 may be considered as a virtual image or as image data to be printed. The image 12 comprises a color 14 which may be obtained by a combination or an overlay of a first and a second color of a first and a second color plane. In a non-limiting example, the color planes may be congruent.

FIG. 6B illustrates a scenario which may be obtained when printing the image 12 with a printer. The scenario may be obtained, for example, when not performing PAD correction. A misalignment of nozzles between printheads for printing the first and the second color planes may result in a shift of a first color plane 16 with respect to a second color plane 18 by a distance 22. The first color plane 16 and the second color plane 18 may be shifted along a direction of a medium axis direction 24 of the printer. This may result in a ramp region or border region 26 in which only the first color plane is present. A second ramp region 28 may also be obtained in which only the second color plane 18 is present. For example, in the first ramp region 26 only a color 32 of the first color plane 16 is printed and in the second ramp region 28 only a color 34 of the second color plane 18 is printed. In an overlapping region 36 where the first color plane 16 and the second color plane 18 overlap the color 14 may be obtained. A media direction of the printer may be one of the directions parallel to the medium axis direction 24. For example, the media direction may be referred to as a forward or a backward direction of the medium axis direction 24.

FIG. 6C schematically illustrates manipulated image data which may be obtained, for example, when manipulating the image data illustrated in FIG. 6A, e.g., when performing 120. First image data associated with the first color plane 16 and/or second image data associated with a second color plane 18 may be manipulated so as to shift the color plane 16 with respect to the color plane 18. Manipulated color planes 16' and 18' may be shifted by an amount or a distance 38 parallel the medium axis direction 24 in a direction opposing the shift that would be obtained when printing the image.

FIG. 6D illustrates a scenario which may be obtained when printing the manipulated image data illustrated in FIG. 6C. A printed image 12' obtained by printing may comprise the overlapping region 36 with reduced extensions of the ramp regions 26 and 28 illustrated in FIG. 6B. The extensions may be reduced partially or completely. In other words, by shifting the color planes 16' and 18' a PAD alignment or an effect according to a PAD alignment may be obtained.

Referring now to FIGS. 7A, 7B, 7C, 7D and 7E simplified illustrations are shown illustrating a scenario in which an image is printed by printing a plurality of image parts. The scenario relates to printing three image parts. Other examples refer to scenarios in which a different number of parts is printed, e.g., two, four or more.

As illustrated in FIG. 7A, the image 12 to be printed may comprise the color 14 as it was described with respect to FIG. 6A.

As illustrated in FIG. 7B, the image data may be manipulated such that the virtual second color plane 18' is shifted with respect to the virtual first color plane 16' by the distance 38 along the medium axis direction 24. The distance 38 may be essentially equal or equal to the distance 22. This may be illustrated as an overhang of the manipulated virtual first color plane 16' with respect to the virtual color plane 18' at a first side of the image and/or as an overhang of the virtual color plane 18' with respect to the virtual color plane 16' at a second side of the image.

As illustrated in FIG. 7C, the manipulated image data may be separated into a first, a second and a third manipulated image parts 42a-42c. In other examples, the image data may be separated into a different number of image parts 42a-42c. A number of image parts obtained may be influenced by a size of the image to be printed and/or by a size of a swath that may be printed during one pass.

At border regions or edges 44a-44d between the image parts 42a-42c the first and the virtual second color plane may be essentially or completely congruent. If the color planes are not completely congruent, this may lead to negligible effects which may not limit the teachings disclosed herein. In other words, after shifting the color planes 16' and 18' and after separating the image into image parts 42a-42c, borders of the color planes 16' and 18' may be arranged on top of each other at the edges 44a-44d.

As illustrated in FIG. 7D, the color planes 16 and 18 may be shifted one to another during printing the manipulated image data and by printing the manipulated image parts 42'a-42'c illustrated in FIG. 7C. The shift obtained during printing may partially or completely compensate for the shift obtained by manipulating the image data described above. Based on the deviation of the printer, the color planes 16' and 18' may be or become incongruent. Thus, an overhang of the printed second color plane 18 may be visible at a printed image part 42'a at an opposing side of the image when compared to the side of the image comprising the virtual overhang of the color plane 18.

The printed image part 42'a may be printed based on the manipulated image part 42a. A printed image part 42'b may be printed based on the manipulated image part 42'b. A printed image part 42'c may be printed based on the manipulated image part 42c. According to an example, each image part 42'a-42'c may be printed during one pass with a printer during which the carriage of the printer may be moved by an actuator of the printer along a supply axis direction (SAD) 46. According to other examples, each image part may be printed during two, three, four or more passes.

Based on the obtained shift of the second color plane 18 with respect to the first color plane 16, the printed image part 42'b may comprise the border regions or ramp regions 26 and 28 as described with respect to FIG. 6B. In other examples, the image part 42'a may be printed during a pass during which the carriage moves along the SAD 46. The image part 42'b may be printed during a movement of the carriage in an opposing direction, for example backwards with respect to the SAD 46.

A ramp region 26 of the image part 42'b may be printed at a region where the ramp region 28 of the image part 42'a was printed before. Accordingly, the ramp region 26 of the image part 42'c may be printed at a region where the ramp region 28 of the printed image part 42'b was printed before. In other words, the ramp regions of different image parts may overlap such that in each ramp region the first color plane 16 and the second color plane 18 is printed. The color of the image may be obtained in the ramp region during a first and a second pass.

As illustrated in FIG. 7E the overlapping ramp regions of the printed image parts 42'a-42'c may result in the printed image 12' as described with respect to FIG. 6D.

The printed image parts 42'a-42'c may be obtained during a so-called one pass mode. In other examples, the printed image parts 42'a-42'c may be obtained in a multi-pass mode comprising, for example but without limitation, a plurality of passes such as 2, 3, 4 or 5 passes.

The manipulated image data may be split into a first manipulated part 42a and a second manipulated part 42c. The manipulated image data may be split into a multitude of parts such that a third image part 42b is obtained which is arranged between the first and the second image part. A processor may be to control the printer such that the first part 42a is printed during a first printing pass and such that the second part 42c is printed during a second printing pass. According to other examples, the image data may be split into a first part and a second part. The first part and the second part may be manipulated to obtain manipulated image parts. The manipulated first part 42a may be printed during a first printing pass and the manipulated second part 42c may be printed during a second printing pass. Each of the image parts may be considered as an image as described with reference to FIGS. 6A-D.

Referring now to FIG. 8, a simplified illustration is shown of a printer carriage 48 comprising printheads 52a-52d. Each color plane of an image may be printed by a respective printhead 52a-52d. A shift 53a-53e of the printheads 52a-52d relative to each other may describe an offset of a position of the printheads 52a-52d along the paper axis direction 24. The shifts 53a-53e of the printheads relative to each other in the medium axis direction may be determined, for example when performing 210. The color planes associated with the printheads may be shifted accordingly but in an opposite direction. The shift obtained by manipulation of the image data may counteract the determined shifts of the printheads 52a-52d. A counteraction obtained by counteracting may refer to reduce the determined shift partially or completely, i.e., to compensate for the determined shifts. An amount by which the color planes associated with the printheads or sets of nozzles are shifted relative to each other for counteracting may be, for example, at least 20% and at most 200%, at least 40% and at most 150% or at least 60% and at most 100% of the determined shifts.

The printheads 52a-52d may be misaligned with respect to each other along the medium axis direction 24. This may be illustrated as a varying position of the printheads 52a-52d along the medium axis direction 24. A first option for alignment might be to deactivate misaligned nozzles outside a range 54. The range 54 may be understood as a range in which the position of the printheads along the SAD overlaps such that each color plane or each color may be printed by the carriage 48. According to an example, one printhead, for example the printhead 52a, may be referred to as the first color plane. A deviation or misalignment of the other printheads 52b-d, with respect to the printhead 52a and therefore a shift of the color planes, may be determined. A range 56 and therefore a printable area printable with one swath or pass of the carriage 48 may be larger when compared to the area 54. The deviation of the printer and/or of the carriage 48 may be determined, for example, when firing the nozzles at least in the ramp regions 58a and 58b. For example, nozzles of the printheads 52a-52d arranged in the ramp regions 58a and 58b may be referred to as misaligned nozzles.

After printing, a deviation between the colors, i.e., an extension of the ramp regions 58a and 58b and/or of the single colors therein may be measured. Such a determined deviation may be provided to a further printer which may be of the same type or constructed similarly.

Based on the four printheads 52a-52d ramp regions 58a and 58b may be obtained at the border of the swath. A number of colors printable at the ramp regions 58a and 58b may be based on the deviation between the printheads 52a-52d. The printheads 52a-52d may comprise an equal extension along the PAD 24. Thus, the ramp regions 58a and 58b may comprise an equal extension along the PAD 24. For example, the ramp regions 58a and 58b may be similar to the ramp regions 26 and 28 described with reference to FIGS. 6A-6D when only two printheads 52a-52d are arranged in the carriage 48. A number of colors present in the ramp region 58a and 58b may decrease or increase along the PAD 24. When referring again to FIG. 7D, the ramp region 58b may be used for printing the ramp region 28 of the image 42'a, for example, when the image comprises four colors and four color planes. The obtained ramp region 58b may printed so as to overlap with the ramp region 58a. The ramp region 58a may be used to print the ramp region 26 of the image part 42'b. The ramp regions 58a and 58b may also be referred to as a four levels ramp as the four colors of the four printheads 52a-52d may overlap partially to obtain a region comprising one color, a region comprising two colors, a region comprising three colors and the region 32 comprising four colors. The ramp regions 58a and 58b may be formed inverse with respect to each other, i.e., an order according to which the colors appear and disappear along the medium axis direction 24 may be equal. For example, a first color such as yellow may first appear in the ramp region 58b along the medium axis direction 24 such that a level one of the ramp region is obtained and may first disappear in the ramp region 58a such that a level three of the ramp region is obtained. A different color, such as magenta, may subsequently appear in the ramp region 58b along the medium axis direction 24 such that a level two of the ramp region is obtained and may secondly disappear in the ramp region 58a such that a level two ramp is obtained. A different color such as black may subsequently appear in the ramp region 58b along the medium axis direction 24 such that a level three of the ramp region is obtained and may thirdly disappear in the ramp region 58a such that a level two ramp is obtained.

An amount by which the second color plane is shifted relative to the first color plane may be less than or equal to an amount of a paper axis deviation of the printer. The deviation may be, for example, a total deviation between the printheads 52a-52d, for example the deviation between the printhead 52a and 52c.

For example, when implementing examples according to the teachings described herein, a color plane associated with the color magenta may be shifted along the medium axis direction 24 with respect to the color plane associated with the color cyan. In other words, the second color plane (magenta) may be shifted relative to the first color plane (cyan) in the medium axis direction 24 along a direction opposing a direction along which the printhead 52b for printing the color magenta is shifted relative to the printhead 52a for printing the color cyan. A shift of other colors with respect to each other and/or with respect to cyan maybe performed accordingly.

When referring again to FIGS. 7A-7E while considering FIG. 8, the processor of the printing system may split the image into manipulated parts 42a-42c at a border perpendicular to the medium axis direction such that edges 44a-44d of the manipulated image parts 42a-42c are obtained. A first printed image part 42'a may be obtained based on printing the first manipulated image part 42a during a first pass. A second printed image part 42'b may be obtained based on printing the second manipulated image part 42b during a second pass. A shift between a printhead 52a-52d to print a first color plane and a second printhead 52a-52d to print the second color plane may result in a shift of the printed second color plane relative to the printed first color plane in the first printed image 42'a part and the second printed image part 42'b. A first ramp region 58b of the first printed image part 42'a may comprise one of the first and second color plane only. A second ramp region 58a of the second printed image part 42'a may be obtained, the second ramp region may comprise the other of the first and second color plane only.

Referring now to FIGS. 9A, 9B and 9C, a scenario of printing an image when PAD alignment is not performed or when nozzles which are misaligned are deactivated is illustrated. The image may be provided as a plurality of un-manipulated image parts. FIG. 9A shows the image 12 to be printed.

As illustrated in FIG. 9B, the image 12 may be printed by three image parts 62a-62c. FIG. 9B illustrates a scenario in which a medium over-advance occurs, i.e., between printing of the image part the media is advanced by a greater distance than expected. This may lead to unprinted regions 64a and 64b between the image parts 62a-62c. The unprinted regions 68a and 64b may be a strongly visible effect and may reduce printing quality.

Referring now to FIG. 9C, a scenario corresponding to FIG. 9B is illustrated in which a media under-advance is occurring, i.e., the medium is advanced between printing the image parts by a shorter distance than expected. This may lead to an overlap of the image parts 62a-62c in regions 66a and 66b. In the regions 66a and 66b color planes may be printed multiply. The overlap of image parts in the regions 66a and 66b may lead to strongly visible effects that may reduce printing quality.

Referring now to FIGS. 10A, 10B and 10C, a scenario illustrating printing of the image 12 is shown according to an example. FIG. 10A illustrates the image 12 comprising the manipulated image data of the virtual color planes 16' and 18', i.e., the color planes may be shifted with respect to each other.

FIG. 10B illustrates a scenario with media over-advance which may be compared to the scenario illustrated in FIG. 9B. Based on the overlap of the ramp regions explained above, regions 64'a-64'd may be obtained in which only one of the color planes 16 or 18 is printed and visible. The regions 64'a-64'd may comprise a smaller extension along the MAD 24 when compared to the regions 64a-64b. A presence of unprinted regions may be prevented. For example, in the region 64a-64b the color of the first color plane or of the second color plane may be printed. This may allow for a high print quality.

Referring now to FIG. 10C, a scenario is shown corresponding to the scenario illustrated in FIG. 9C, i.e., a print during which under-advance of the media occurs. Instead of the area 66a and 66b, small regions 68a-68d may be obtained at regions where the image parts overlap due to a medium under-advance. The regions 68a-68d may correspond to lines or regions in which different image parts overlap. When compared to the regions 66a and 66b, the regions 68a-68d may comprise a smaller lateral extension along the MAD 24.

In other words, line banding caused by media advance error may be reduced or compensated. Line banding may be a dark line banding in the case of under-advance or white lines in the case of over-advance. Examples described herein allow for using large swaths and, therefore, printing with fast speeds, as it is not needed to align first and last nozzles for all colors in at least one example. This may allow for a low accuracy of the driving mechanism which can be used while obtaining a high quality of the print. This may allow for reducing cost and/or for increasing media advance speed. Examples described herein may provide a low likelihood of having an empty line or a dark line due to overlaps of all the colors.

Figure 11:
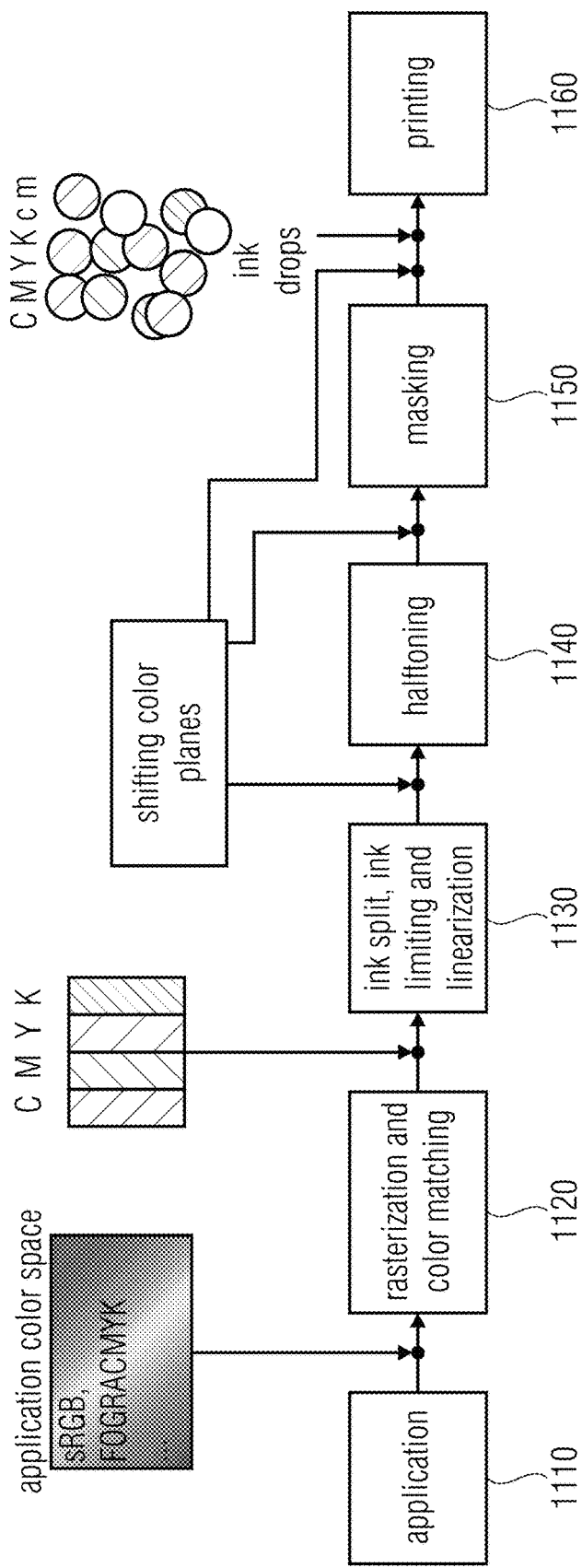
FIG. 11 is a simplified illustration of a printing process according to one example.

Referring now to FIG. 11, a schematic printing process is shown. At 1110 an image to be printed may be obtained from an application. At 1120 a restoration and color matching may be performed such that an application color space, such as RGB, may be transferred to a printer color space, such as CMYK. At 1130 an ink split, an ink limiting and/or a linearization may be performed. At 1140 a half toning may be performed. At 1150 a masking may be performed. At 1160 the masked information may be printed, i.e., ink drops may be deposited onto the media. Shifting the color planes, for example, by manipulating image data as described herein, may be performed at any point of the process after the basic colors of the printer have been determined. For example, the color planes may be shifted after 1130, 1140 and/or 1150.

In other words, printhead alignment may be obtained by printing a pattern, measuring a pen deviation in SAD and PAD. A SAD correction may be performed by calculating and applying the corrections to a carriage file. PAD corrections may be calculated but may remain unapplied through the carriage. Color planes be displaced in the opposite direction of the measured deviation in PAD. This can be done at any point after the color map, i.e., after the image to be printed is transferred to the basic colors of the printer. Shifting of the color planes may be performed before the image is separated into passes. The image may be printed applying PEN alignment corrections only in SAD direction. PAD correction may have already been performed by shifting the color planes.

PAD corrections may be performed by storing the correction and by applying these PAD corrections to the individual color planes in the imaging pipeline. This allows for printing with an aligned output but with a small staggering between colors. A result may be that ramps or ramp regions are created at the edges of the swath as described in FIG. 8. Thus, although not applying PAD correction in the carriage, the image may be correctly aligned as described with respect to FIGS. 6A-6D. In other words, examples provide a method for using non-aligned nozzles so that there is overlap between different planes in consecutive passes; and, therefore, contrast at the swath boundaries is reduced, especially in the presence of paper advance errors.

Figure 12:
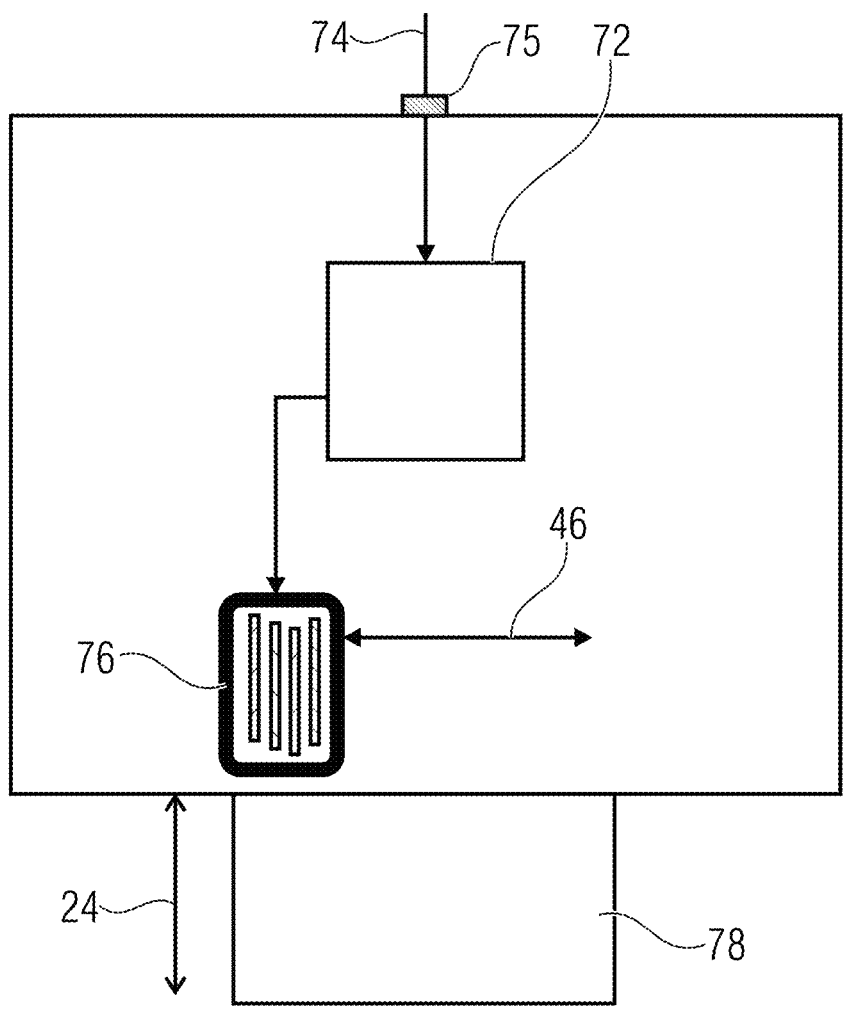
FIG. 12 is a schematic block diagram of a printing according to one example.

Referring now to FIG. 12, a schematic block diagram of a printing system 125 is illustrated. The printing system 125 comprises a printer 127 comprising a processor 72. The printer may receive image data 74 via an interface 75. The interface may be, for example, a card slot or a wired or wireless connection to a computer. The image data 74 may describe an image to be printed, for example, the image 12. The image data 74 may be received with the processor. The image data 74 may be manipulated with the processor 72 such that the second color plane is shifted relative to the first color plane in the medium axis direction 24 of the printer 127. A printing unit 76 of the printer, e.g., the carriage 48, may be controlled by the processor 72 such that manipulated image data may be printed on a medium 78.

Referring now to FIG. 13, a schematic block diagram of a printing system 135 is illustrated. The printing system 135 may comprise a controller such as a computer or the like. The controller 82 may comprise the processor 72. A printer 127' may receive manipulated and/or split image data 74' via the interface 75 such that the deviation of the printer 127' is pre-compensated for by the controller 82. For example, the pre-compensation may be implemented by a printer driver implemented in the controller 82.

Examples relate to a non-transitory machine-readable storage medium encoded with instructions executable by a processing resource of a computing device to perform methods described herein.

Examples described herein may refer to printheads for printing different colors, the printheads misaligned to each other. Other examples may refer to printing systems comprising a printhead for printing a first and a second color. For example, a printhead may be configured for printing cyan, magenta, yellow and black. This printhead may be referred to as a CMYK pen. Different nozzles for printing different colors may be misaligned with respect to each other, such that the colors may be misaligned to each other even if only one printhead is used for printing. The teachings disclosed herein may refer to shift color planes of a printhead with respect to each other. In other words a first set of nozzles may be used to print a first color and a second set of nozzles may be used to print a second color. A printhead may comprise one set of nozzles to print one color or may comprise a second set of nozzles to print a second color. A printhead may comprise more than two sets of nozzles to print more than two colors.

Examples relate to a non-transitory machine-readable storage medium encoded with instructions executable by a processing resource of a computing device to operate a printing system, for example an ink-jet printing system. A processor of the printing system may be a processor of a printer of the printing system.

It would be appreciated that examples described herein can be realized in the form of hardware, machine readable instructions or a combination or hardware and machine readable instructions. Any such machine readable instructions may be stored in the form of volatile or non-volatile storage such as, for example, a storage device such as a ROM, whether erasable or rewritable or not, or in the form of memory such as, for example, RAM, memory chips device or integrated circuits or an optically or magnetically readable medium such as, for example, a CD, DVD, magnetic disc or magnetic tape. It would be appreciated that these storage devices and storage media are examples of machine readable storage that are suitable for storing a program or programs that, when executed, implement examples described herein.

All of the features disclosed in the specification (including any accompanying claims, abstract and drawings) and/or all of the features of any method or progress disclosed may be combined in any combination, except combinations where at least some of such features are mutually exclusive.

Each feature disclosed in the specification (including any accompanying claims, abstract and drawings) may be replaced by alternative features serving the same, equivalent or similarly proposed, unless expressly stated otherwise. Thus, unless expressly stated otherwise, each feature disclosed is one example only of a generic series of equivalent or similar features.

The invention claimed is:

1. A printing system comprising:
a processor to obtain image data comprising first image data defining a first color plane of the image and comprising second image data defining a second color plane of the image;
wherein the processor is to manipulate the image data such that the second color plane is shifted relative to the first color plane in a medium axis direction of a printer;
a printer to print the manipulated image data with the printer;
wherein a first ramp region of a first printed image part, which comprises only one of the first and second color planes, and a second ramp region of a second printed image part, which comprises the other of the first and second color plane different from the color in the first ramp region, is obtained; and
wherein the ramp region of the first printed image part forms an inverse ramp region with respect to the ramp region of the second printed image part.

2. The printing system according to claim 1, wherein the processor is a part of the printer or is a part of a controlling unit to control the printer.

3. The printing system according to claim 1, wherein the image data comprise third image data defining a third color plane of the image, wherein the processor is to manipulate the image data such that the third color plane is shifted relative to the first color plane and relative to the second color plane in the medium axis direction of the printer.

4. The printing system according to claim 1, wherein the printer comprises a plurality of sets of nozzles, wherein each color plane is to be printed by a respective set of nozzles, the printing system to determine shifts of the set of nozzles relative to each other in the medium axis direction, wherein an amount by which the color planes are shifted relative to each other is to counteract the determined shifts.

5. The printing system according to claim 1, wherein the processor is to
split the manipulated image data into a first part and a second part, and to control the printer such that the first part is printed during a first printing pass and such that the second part is printed during a second printing pass.

6. The printing system according to claim 1,
wherein the processor is to split the manipulated image data into a first part and a second part, and to control the printer such that the first part is printed during a first printing pass and such that the second part is printed during a second printing pass;
wherein the processor is to split the first and the second manipulated image parts at a border perpendicular to the medium axis direction, wherein the first printed image part is obtained based on printing the first manipulated image part during the first pass and wherein the second printed image part is obtained based on printing the second manipulated image part during the second pass, wherein a shift between a first set of nozzles to print the first color plane and a second set of nozzles to print the second color plane results in a shift of the printed second color plane relative to the printed first color plane in the first printed image part and the second printed image part;
wherein the first printed image part and the second printed image part are printed such that they at least partially overlap in the ramp regions.

7. The printing system of claim 1, wherein the processor is to manipulate the image data such that, in a single pass of a printhead carriage, the second color plane is shifted relative to the first color plane in the print medium axis direction of the printer.

8. A method for printing an image, comprising:
obtaining, using a processor of a printing system, image data comprising first image data defining a first color plane of the image and second image data defining a second color plane of the image;
manipulating, using the processor, the image data such that the second color plane is shifted relative to the first color plane in a medium axis direction of a printer of the printing system;
printing the manipulated image data using the printer;
wherein a first ramp region of a first printed image part, which comprises only one of the first and second color plane only, and a second ramp region of a second printed image part, which comprises the other of the first and second color plane different from the color in the first ramp region, is obtained; and
wherein the ramp region of the first printed image part forms an inverse ramp region with respect to the ramp region of the second printed image part.

9. The method according to claim 8, wherein the image data comprise third image data defining a third color plane of the image, wherein the image data are manipulated such that the third color plane is shifted relative to the first color plane and relative to the second color plane in the medium axis direction of the printer.

10. The method according to claim 8, wherein each color plane is to be printed by a respective set of nozzles, further comprising:
determining shifts of the sets of nozzles relative to each other in the medium axis direction, wherein an amount by which the color planes are shifted relative to each other is to counteract the determined shifts.

11. The method according to claim 8, comprising:
a) splitting, using the processor, the manipulated image data into a first part and a second part, the first part printed during a first printing pass and the second part printed during a second printing pass, or
b) splitting, using the processor, the image data into a first part and a second part, manipulating the first part, manipulating the second part, printing the manipulated first part during a first printing pass and printing the manipulated second part during a second printing pass.

12. The method according to claim 8, comprising:

splitting, using the processor, the manipulated image data into a first part and a second part, the first part printed during a first printing pass and the second part printed during a second printing pass;

wherein the first and the second manipulated image parts are split at a border perpendicular to the medium axis direction, wherein the first printed image part is obtained based on printing the first manipulated image part during the first pass and wherein the second printed image part is obtained based on printing the second manipulated image part during the second pass, wherein a shift between a first set of nozzles printing the first color plane and a second set of nozzles printing the second color plane results in a shift of the printed second color plane relative to the printed first color plane in the first printed image part and the second printed image part, wherein the first printed image part and the second printed image part are printed such that they at least partially overlap in the ramp regions.

13. The method according to claim 8, comprising:

determining a supply axis deviation of the printer along a direction perpendicular to the medium axis direction, the supply axis deviation comprising information indicating a deviation of positions of ink drops printed by the printer with respect to each other; and manipulating a timing of the ink drops such that the supply axis deviation after manipulating the timing is lower when compared to the supply axis deviation before manipulating the timing.

14. A non-transitory machine-readable storage medium encoded with instructions executable by a processing resource of a computing device to operate a printing system to perform a method, the method comprising:

obtaining, using a processor of a printing system, image data comprising first image data defining a first color plane of the image and second image data defining a second color plane of the image;

manipulating the image data with the processor such that the second color plane is shifted relative to the first color plane in a medium axis direction of a printer of the printing system;

printing the manipulated image data with the printer;

wherein a first ramp region of a first printed image part, which comprises only one of the first and second color planes, and a second ramp region of a second printed image part, which comprises the other of the first and second color plane different from the color in the first ramp region, is obtained; and wherein the ramp region of the first printed image part forms an inverse ramp region with respect to the ramp region of the second printed image part.

15. A printing system comprising:

a carriage;

a plurality of printheads mounted on the carriage, the carriage to move back-and-forth across a print medium path, each printhead to print a different color to a print medium in the print medium path; and a processor to obtain image data comprising first image data defining one to four passes of the carriage to complete a desired printing, the first image data defining a first color plane of the image and comprising second image data defining a second color plane of the image;

wherein the processor is to manipulate the image data such that, in a single pass of the carriage, the second color plane is shifted relative to the first color plane in a print medium axis direction of the printing system in a manner to compensate for misaligned nozzles;

wherein the processor to output the manipulated image data to the printheads for printing a swath of an image defined by the image data, the swath to have top and bottom edges along which edges of the color planes are shifted relative to each other in the print medium axis direction; and wherein a change in the image data of the first color plane and the second color plane results in a shift of a printed first color plane relative to the printed second color plane in a swath of the image such that a first ramp region, which comprises only one of the first and second color planes, and a second ramp region, which comprises the other of the first and second color plane different from color in the first ramp region, is obtained at a top and bottom of the swath respectively in the print medium axis direction of the printing system.

16. The printing system according to claim 15, wherein the image data comprise third image data defining a third color plane of the image, wherein the processor is to manipulate the image data such that the third color plane is shifted relative to the first color plane and relative to the second color plane in the medium axis direction of the printer.

17. The printing system according to claim 15, wherein the processor is to manipulate the image data for a second pass of the carriage such that the second color plane is again shifted relative to the first color plane in a print medium axis direction of the printing system.

18. The printing system according to claim 15, wherein the processor is to split the image data into a number of swaths of the carriage.

* * * * *

UNITED STATES PATENT AND TRADEMARK OFFICE
CERTIFICATE OF CORRECTION

| | |
|---|---|
| PATENT NO. | : 10,471,731 B2 |
| APPLICATION NO. | : 15/546241 |
| DATED | : November 12, 2019 |
| INVENTOR(S) | : Joan Albert Jorba Closa et al. |

It is certified that error appears in the above-identified patent and that said Letters Patent is hereby corrected as shown below:

In the Drawings

In sheet 5 of 13, FIG. 5, reference numeral 560, Line 1, delete "prin" and insert -- print --, therefor.

Signed and Sealed this
Tenth Day of March, 2020

Andrei Iancu
*Director of the United States Patent and Trademark Office*